United States Patent
Kwon

(10) Patent No.: US 7,350,935 B2
(45) Date of Patent: Apr. 1, 2008

(54) BACKLIGHT ASSEMBLY

(75) Inventor: Sun Young Kwon, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 144 days.

(21) Appl. No.: 10/983,591

(22) Filed: Nov. 9, 2004

(65) Prior Publication Data
US 2005/0213312 A1  Sep. 29, 2005

(30) Foreign Application Priority Data
Mar. 25, 2004  (KR) .................. 10-2004-0020387

(51) Int. Cl.
*F21S 4/00* (2006.01)
(52) U.S. Cl. .............. 362/225; 362/217; 362/614
(58) Field of Classification Search .............. 362/217, 362/224, 225, 614, 630, 631, 260, 27, 29; 323/215, 355, 361; 315/220, 209 R, 291
See application file for complete search history.

(56) References Cited

U.S. PATENT DOCUMENTS

| | | | | |
|---|---|---|---|---|
| 5,686,798 | A  * | 11/1997 | Mattas | 315/244 |
| 6,854,856 | B2 * | 2/2005  | Shin et al. | 362/613 |
| 6,939,019 | B2 * | 9/2005  | Choi et al. | 362/613 |
| 2004/0027049 | A1 | 2/2004 | Lee et al. | 313/486 |
| 2005/0062436 | A1 * | 3/2005 | Jin | 315/244 |
| 2006/0120109 | A1 * | 6/2006 | Inoue et al. | 362/614 |

FOREIGN PATENT DOCUMENTS

| JP | 2001-307531 | 11/2001 |
|---|---|---|
| KR | 10-2004-0014081 A | 2/2004 |

* cited by examiner

*Primary Examiner*—John Anthony Ward
(74) *Attorney, Agent, or Firm*—Morgan, Lewis & Bockius LLP

(57) ABSTRACT

A backlight assembly includes at least two light sources. Each of the at least two light sources includes a first end portion and a second end portion. The first end portions of the at least two light sources are adjacent to each other. The second end portions of the at least two light sources are adjacent to each other. The backlight assembly also includes a voltage supplier for applying a high voltage to the adjacent first end portions of the at least two light sources and a low voltage to the adjacent second end portions of the at least two light sources.

14 Claims, 6 Drawing Sheets

The related art

The related art

BACKLIGHT ASSEMBLY

The present invention claims the benefit of Korean Patent Application No. 10-2004-20387 filed on Mar. 25, 2004, which is hereby incorporated by reference.

BACKGROUND OF THE INVENTION

1. Field of the Invention

The present invention relates to a liquid crystal display (LCD) device, and more particularly, to a backlight assembly for an LCD device.

2. Discussion of the Related Art

In recent years, various flat panel display devices, such as a liquid crystal display (LCD), a plasma display panel (PDP), an electroluminescent display (ELD), and a vacuum fluorescent display (VFD), have been developed. Among the various flat panel display devices, liquid crystal display (LCD) devices have been most widely used instead of cathode ray tube (CRT) devices because they are thin, light, and consumes less power. LCD devices have been used for desktop and mobile computer monitors, and televisions display.

Advances in picture quality enhancement for LCD devices have been lagging, in some respects, other features and advantages of the LCD devices. Picture quality improvement is needed for using LCD devices as general purpose displays in various applications. For example, in addition to being light, thin and low-powered, LCD devices need provide high resolution and high luminance on a large-sized screen.

In general, an LCD device includes an LCD panel for displaying a picture image, and a driving part for applying a driving signal to the LCD panel. The LCD panel includes first and second glass substrates being bonded to each other at a predetermined interval therebetween, and a liquid crystal material injected between the first and second glass substrates.

The first glass substrate includes a plurality of gate and data lines, a plurality of pixel electrodes, and a plurality of thin film (TFT) transistors. The first glass substrate is also called a TFT array substrate. The gate lines are formed on the first glass substrate at fixed intervals. The data lines are formed perpendicular to the plurality of gate lines at fixed intervals. Crossings of the gate lines and the data lines define pixel regions. The plurality of pixel electrodes, arranged in a matrix-type configuration, are respectively formed in the pixel regions. The thin film transistors are switched in response to signals from the gate lines and transmit signals from the data lines to the respective pixel electrodes.

The second glass substrate (color filter substrate) includes a black matrix layer, an RGB color filter, and a common electrode. The black matrix layer blocks light transmission except within the pixel regions of the first substrate. The RGB color filter layer provides color display capability. The common electrode, together with the pixel electrodes, controls light transmission for displaying a desired image. A predetermined distance is maintained between the first and second glass substrates by spacers. The first and second substrates are bonded to each other by a sealant.

In general, an LCD device requires an external light source for proper operation. For example, in a transmitting type LCD device, a backlight is required for emitting and guiding light to a rear surface of the LCD panel. The backlight may a direct type or an edge type.

In the direct type backlight, a silhouette of a fluorescent lamp may be reflected on the LCD panel. Thus, a predetermined interval should be maintained between the fluorescent lamp and the LCD panel. The direct type backlight requires a light-scattering device to provide a light source of uniform luminance. Further, the size of the light-emitting surface in the backlight increases in accordance with the size of the panel. The size of the direct type backlight has an impact on the thickness of the light-scattering device. If the thickness of the light-scattering device is not appropriate, the light-emitting surface is not flat.

In the edge type backlight, a cylindrical fluorescent lamp is placed at one side of the LCD panel. A light-guiding plate is installed to transmit the light emitted from the fluorescent lamp to the entire surface of the LCD panel. The edge type backlight has low luminance. Also, appropriate optical design and processing technology of the light-guiding plate rare required to obtain uniform luminance. Recently, two bending-type light sources have been used in the edge type backlight to achieve uniform luminance.

FIG. 1 is a schematic view illustrating a backlight assembly using a bending-type light source according to a related art arrangement. FIG. 2 is a schematic view illustrating a printed circuit board (PCB) provided on a rear surface of the related art light-guiding plate depicted in FIG. 1. Referring to FIG. 1 and FIG. 2, the related art backlight assembly is provided with a first light source 11a, a second light source 11b, a first inverter 21a, and a second inverter 21b. The first light source 11a emits light toward a light-guiding plate 12. The first light source 11a is bent in an L-shape along one long side and one short side of the light-guiding plate 12. The second light source 11b, which emits toward the light-guiding plate 12, in bent in an L-shape along the other long side and the other short side of the light-guiding plate 12. The first inverter 21a provides a high voltage H and a low voltage L to the first light source 11a. The second inverter 21b provides a high voltage H and a low voltage L to the second light source 11b.

A wire 10a for the high voltage H and a wire 10b for the low voltage L are provided at both ends of the first light source 11a. The wire 10a for the high voltage H and the wire 10b for the low voltage L are also provided at both ends of the second light source 11b. Furthermore, a first connector 13a and a second connector 13b are provided to the backlight assembly. The first connector 13a is connected to the wire 10a for the high voltage H and the wire 10b for the low voltage L of the first light source 11a. The second connector 13b is connected to the wire 10a for the high voltage H and the wire 10b for the low voltage L of the second light source 11b. The first connector 13a is connected to the first inverter 21a, and the second connector 13b is connected to the second inverter 21b.

A plurality of light-diffusion members (not shown) and an LCD panel (not shown) are provided on the light-guiding plate 12. The light-diffusion members are provided with a light-diffusion sheet and a polarizing film. The light-diffusion sheet scatters and diffuses light emitted from the first and second light sources 11a and 11b through the light-guiding plate 12. Also, the polarizing film is provided on the light-diffusion sheet to receive the diffused light from the light-diffusion sheet and to transmit light with improved luminance toward a display area of the LCD panel.

In addition, a U-shaped lamp housing (not shown) having an open side toward the light-guiding plate 12 may be provided in the circumference of the light sources 11a and 11b to obtain a smooth transmission of the light emitted from the light sources 11a and 11b to the light-guiding plate 12. A reflective sheet (not shown) may be provided below the light-guiding plate 12 to reflect light leaking through the lower side of the light-guiding plate 12 tooward the display part of the LCD panel, thereby reducing light loss.

Referring to FIG. 2, a printed circuit board (PCB) 20 is provided on a rear surface of the light-guiding plate 12. The first and second inverters 21a and 21b are mounted on the PCB 20 to provide a driving voltage to the first and second light sources 11a and 11b. A first and a second transformers (not shown) are provided to each of the first and second inverters 21a and 21b to supply the high voltage H and the low voltage L to both sides of each of light sources 11a and 11b. The first transformer for the first inverter 21a outputs the high voltage H. Then, the high voltage H is transmitted to the first connector 13a along a first metal pattern 15a of the PCB 20. The high voltage H inputted to the first connector 13a is applied to one side of the first light source 11a through the wire 10a. The second transformer for the first inverter 21a outputs the low voltage L. Then, the low voltage L is transmitted to the first connector 13a along another first metal pattern 15a of the PCB 20. The low voltage L inputted to the first connector 13a is applied to the other side of the first light source 11a through the wire 10b.

Similarly for the second inverter 21b, the high voltage H and the low voltage L of the first and second transformers are respectively applied to one side and the other side of the second light source 11b through the wire 10a and the wire 10b, both of which are connected to the second connector 13b. The second connector 13b and the output terminals for the high voltage H and the low voltage L in the respective transformers of the second inverter 21b are connected with a second metal pattern 15b.

Meanwhile, the first inverter 21a applies the high voltage H and the low voltage L to the both sides of the first light source 11a. One of the wire 10a and the wire 10b, which are connected to both sides of the first light source 11a, becomes longer than the other. Similarly, the second inverter 21b applies the high voltage H and the low voltage L to the both sides of the second light source 11b. One of the wire 10a and the wire 10b, which are connected to both sides of the second light source 11b, becomes longer than the other.

As shown in FIGS. 1 and 2, the wire 10b is longer than the wire 10a. However, the wire 10a can be made longer than the wire 10b. In the case of small-sized LCD devices having mechanical restrictions, especially, LCD devices for vehicles, the difference in length in the wires makes it difficult to obtain a thin LCD device.

SUMMARY OF THE INVENTION

Accordingly, the present invention is directed to a backlight assembly that substantially obviates one or more problems due to limitations and disadvantages of the related art.

An object of the present invention is to provide a thin backlight assembly.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, the backlight assembly includes at least two light sources, each of which including a first end portion and a second end portion, respectively, the first end portions of the at least two light sources being adjacent to each other, and the second end portions of the at least two light sources being adjacent to each other; and a voltage supplier for applying a high voltage to the adjacent first end portions of the at least two light sources and a low voltage to the adjacent second end portions of the at least two light sources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

Figure 1:
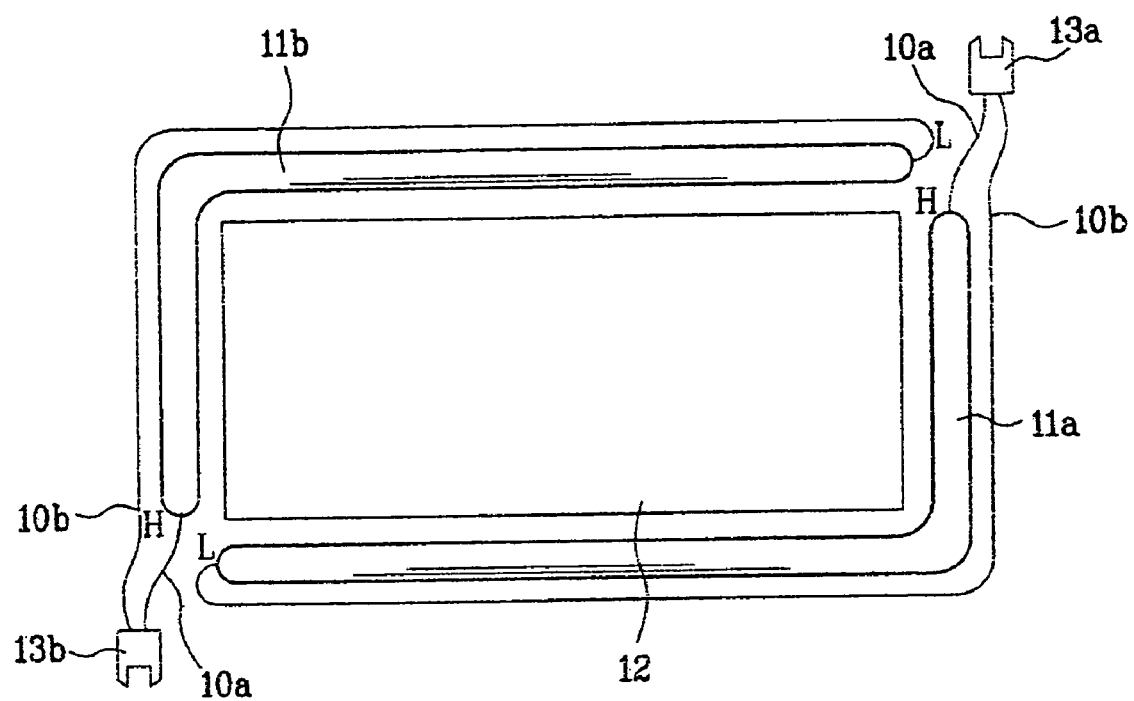
FIG. 1 is a schematic view illustrating a backlight assembly using a bending-type light source according to a related art arrangement.
Figure 2:
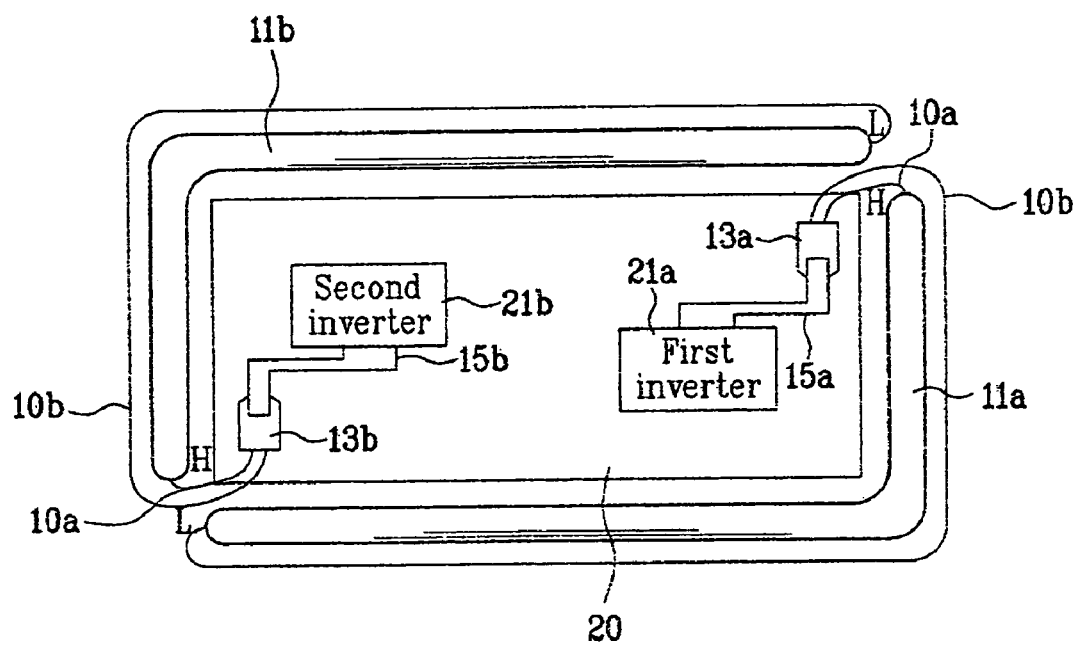
FIG. 2 is a schematic view illustrating a printed circuit board (PCB) provided on a rear surface of the related art light-guiding plate depicted in FIG. 1.
Figure 3:
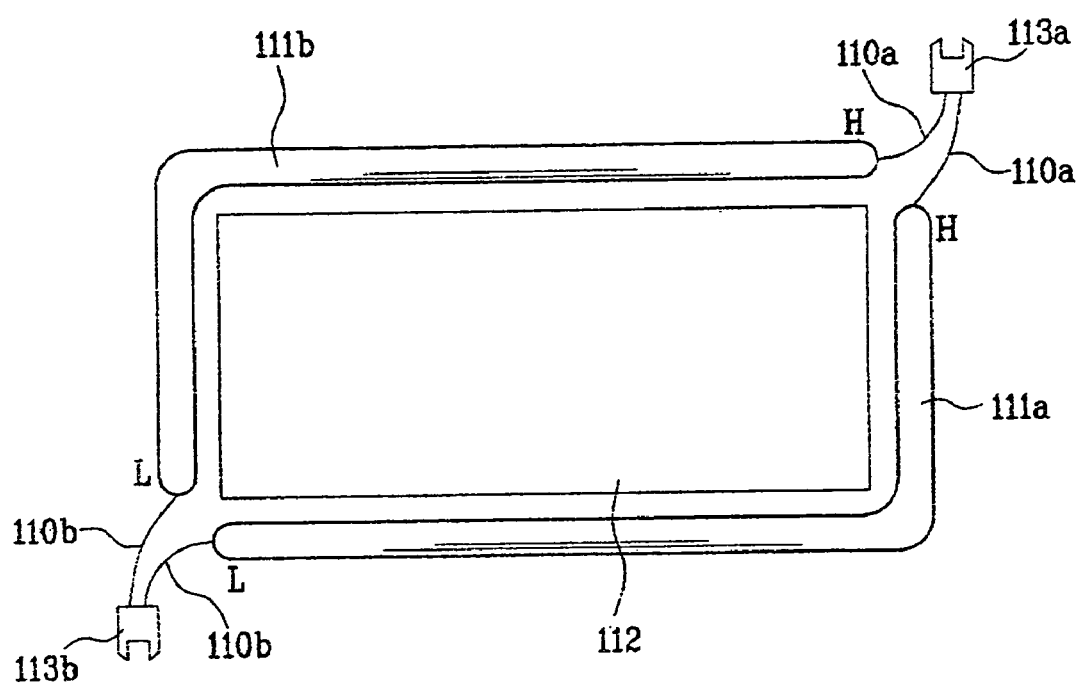
FIG. 3 is a schematic view of an exemplary backlight assembly in accordance with a first embodiment of the present invention.
Figure 4:
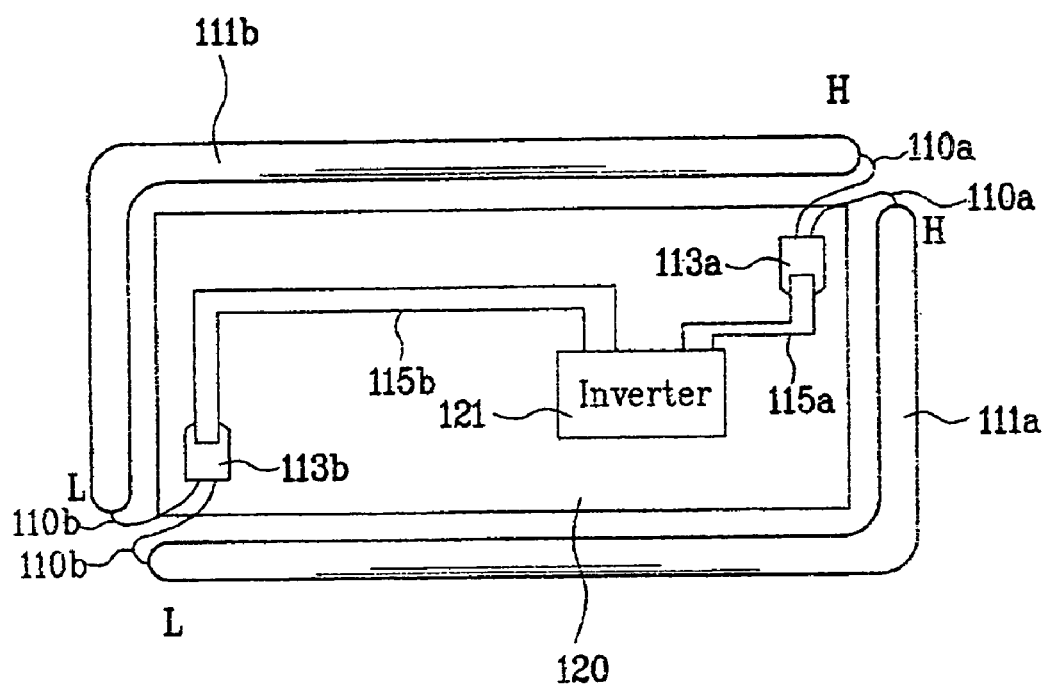
FIG. 4 is a schematic view of an exemplary PCB provided on a rear surface of the light-guiding plate depicted in FIG. 3.

FIG. 3 is a schematic view of an exemplary backlight assembly in accordance with a first embodiment of the present invention. FIG. 4 is a schematic view of an exemplary PCB provided on a rear surface of a light-guiding plate depicted in FIG. 3. Referring to FIGS. 3 and 4, the backlight assembly includes a first light source 111a, a second light source 111b, a plurality of wires 110a for applying a high voltage H, a plurality of wires 110b for applying a low voltage L, and an inverter 121. The first light source 111a, which emits light toward a light-guiding plate 112, is bent as an "L" along one long side and one short side of the light-guiding plate 112. The second light source 111b, which also emits light to the light-guiding plate 112, is bent as an "L" along another long side and another short side of the light-guiding plate 112. The wires 110a are connected to adjacent first end portions of the first and second light sources 111a and 111b, respectively. The wires 110b are connected to adjacent second end portions of the first and second light sources 111a and 111b, respectively. The inverter 121 applies the high voltage H to the first end portions of light sources 111a and 111b, respectively, through the wire 110a. The inverter 121 applies the low voltage L to the second end portions of light sources 111a and 111b, respectively, through the wire 110b. The light sources 111a and 111b may include fluorescent lamps (hot cathode or cold cathode), for example.

A plurality of light-diffusion members (not shown) and an LCD panel (not shown) are provided on the light-guiding plate 112. The light-diffusion members are provided with a light-diffusion sheet and a polarizing film (not shown). The light-diffusion sheet scatters and diffuses the light emitted by the first and second light sources 111a and 111b through the light-guiding plate 112. The polarizing film receives the diffused light from the light-diffusion sheet and transmit a polarized light toward a display part of the LCD panel. The polarizing film also improves the luminance of the transmitted light.

A "U"-shaped lamp housing (not shown) may be provided in the circumference of the light sources 111a and 111b. The "U"-shaped lamp housing has an open side oriented toward the light-guiding plate 112. The "U"-shaped lamp provides a smooth transmission of the light emitted from the light sources 111a and 111b to the light-guiding plate 112. A reflective sheet (not shown) may also be provided below the light-guiding plate 112. The reflective sheet reduces loss of light by reflecting light leaking through the lower side of the light-guiding plate 112 to the display part of the LCD panel.

Meanwhile, the wires 110a for applying the high voltage H are connected to a first connector 113a. The wires 110b for applying the low voltage L are connected with a second connector 113b. The first connector 113a receives the high voltage H provided by the inverter 121, and transmits the high voltage H to the wire 110a. Also, the second connector 113b receives the low voltage L provided by the inverter 121, and transmits the low voltage L to the wire 110b.

In the backlight assembly according to embodiments of the present invention, the wires 110a connect respective adjacent end portions of the first and second light sources 111a and 111b with the first connector 113a. The wires 110b connect respective adjacent other end portions of the first and second light sources 111a and 111b with the second connector 113b. Accordingly, when applying the high voltage H and the low voltage L to the both end portions of each light source 111a and 111b, respectively, it is possible to decrease the length of the wires 110a and 110b.

In contrast with the related art arrangement, the first and second connectors 113a and 113b receive the high voltage H and the low voltage L, respectively, and transmit the high voltage H and the low voltage L to light sources 111a and 111b, respectively. As a result, the length of wire 110a connecting a first end portion of each of the first and second light sources to the first connector 113a is decreased. Similarly, the length of wire 110b connecting another end portion of each of the first and second light sources to the second connector 113b is also reduced.

Figure 5:
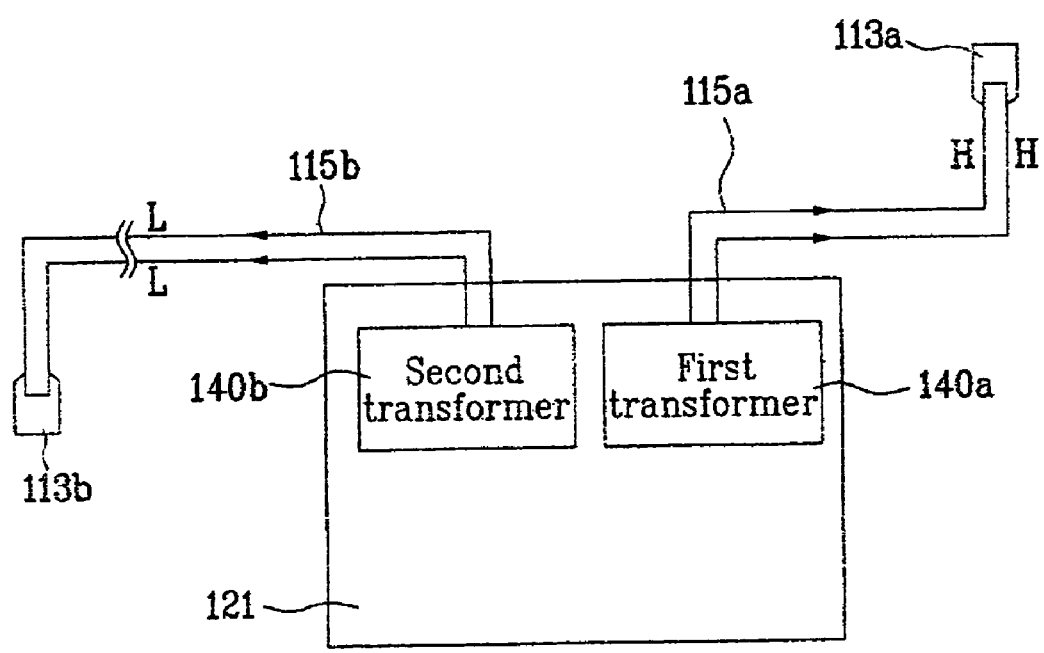
FIG. 5 is a block diagram of an exemplary inverter as depicted in FIG. 4.

FIG. 4 is a schematic view of an exemplary PCB provided on a rear surface of a light-guiding plate depicted in FIG. 3. As shown in FIG. 4, a printed circuit board (PCB) 120 is provided on a rear surface of the light-guiding plate 112, and the inverter 121 is mounted on the PCB 120. FIG. 5 is a block diagram of an exemplary inverter as depicted in FIG. 4. Referring to FIG. 5, the inverter 121 is provided with a first transformer 140a for outputting the high voltage H, and a second transformer 140b for outputting the low voltage L. A first metal pattern 115a is provided on the PCB 120 to transmit the high voltage H outputted from the first transformer 140a to the first connector 113a. A second metal pattern 115b is also provided on the PCB 120 to transmit the low voltage L outputted from the second transformer 140b to the second connector 113b.

The inverter 121 is closer to one end portion of the light sources 111a and 111b, than to the other end portion of the light sources 111a and 111b, on the PCB 120. Accordingly, the distance between the first transformer 140a of the inverter 121 and the first connector 113a is shorter than the distance between the second transformer 140b of the inverter 121 and the second connector 113b. Specifically, the length of the first metal pattern 115a connecting an output terminal of the first transformer 140a to the first connector 113a is shorter than the length of the second metal pattern 115b connecting an output terminal of the second transformer 140b with the second connector 113b. By shortening the first metal pattern 115a to which the high voltage H is applied, it is possible to minimize loss of energy due to a voltage drop across the first metal pattern 115a from the applied high voltage H.

The second metal pattern 115b is relatively longer than the first metal pattern 115a, thus resulting in a possible voltage drop across the second metal pattern 115b due to the applied low voltage L. However, the voltage drop due to the applied low voltage L causes a lower energy loss than the voltage drop due to the high voltage H. In this respect, preferably, the first metal pattern 115a, to which the high voltage H is applied, is shorter than the second metal pattern 115b, to which the low voltage L is applied.

The process for manufacturing the second transformer 140b imposes more constraints on a patterning artwork than the process for manufacturing the first transformer 140a within the inverter 121. In this respect, it is preferable to form the first metal pattern 115a, which is simpler and shorter than the second metal pattern 115b. In order to overcome the aforementioned problem, two inverters may be used in a backlight assembly.

Figure 6:
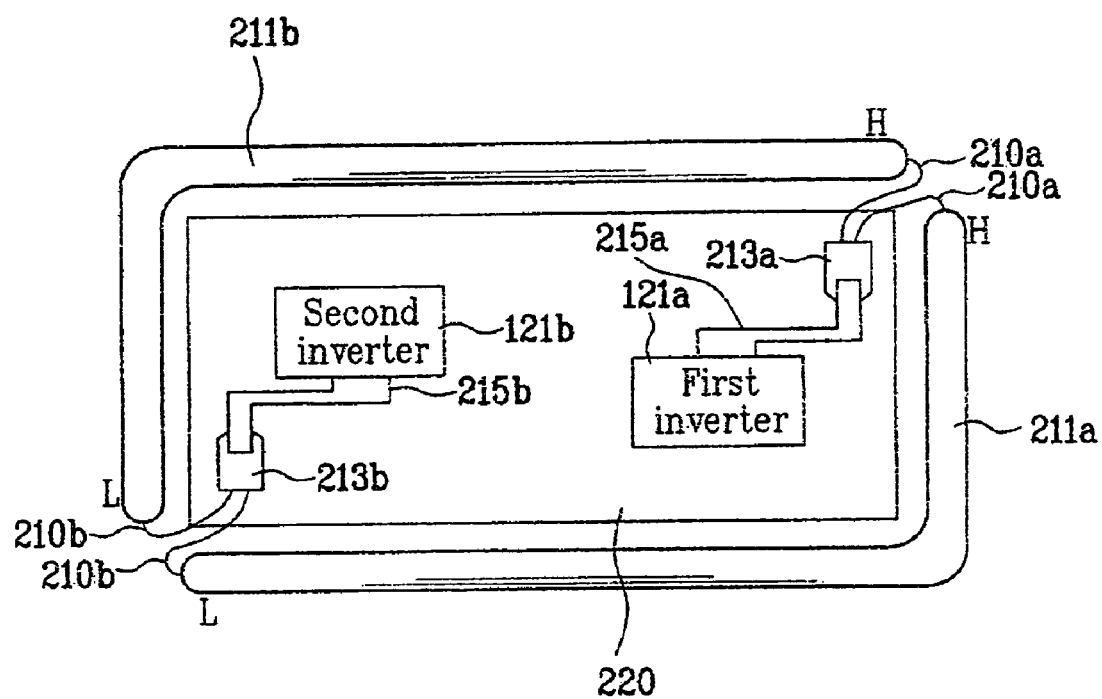
FIG. 6 is a schematic view of an exemplary backlight assembly in accordance with a second embodiment of the present invention.

FIG. 6 is a schematic view of an exemplary backlight assembly in accordance with a second embodiment of the present invention. As shown in FIG. 6, the backlight assembly according to the second embodiment of the present invention is provided with a first light source 211a, a second light source 211b, a plurality of wires 210a for applying a high voltage H, a plurality of wires 210b for applying a low voltage L, a first inverter 121a, and a second inverter 121b. The first light source 211a is bent according to an L-shape along one long side and one short side of a light-guiding plate 112. The second light source 211b is bent according to an L-shape along the other long side and the other short side of the light-guiding plate 112. The first light source 211a and the second light source 211b emit light toward the light-guiding plate 112.

The wires 210a are connected to respective adjacent first end portions of the light sources 211a and 211b. The wires 210b are connected to respective adjacent second end portions of the light sources 211a and 211b. The first inverter 121a provides the high voltage H to respective first end portions of the first and second light sources 211a and 211b through the wires 210a. The second inverter 121b provides the low voltage L to respective second end portions of the first and second light sources 211a and 211b through the wires 210b.

The first inverter 121a includes a first transformer (not shown) for outputting the high voltage H, and the second inverter 121b has a second transformer (not shown) for outputting the low voltage L. Also, the first and second inverters 121a and 121b are mounted on a PCB 220. A first metal pattern 215a connects the first transformer of the first inverter 121a to the first connector 213a. A second metal pattern 215b connects the second transformer of the second inverter 121b to the second connector 213b.

In accordance with this arrangement, the first inverter 121a is adjacent to respective first end portions of the first and second light sources 211a and 211b. The second inverter 121b is adjacent to respective second end portions of the first and second light sources 211a and 211b. Accordingly, a length of each of the first and second metal patterns 215a and 215b is minimized. Thus, it is possible to minimize loss of energy associated with a voltage drop across the second metal pattern 215b due to the applied low voltage L. Similarly, it is possible to minimize loss of energy associated with a voltage drop across the first metal pattern 215a due to the applied high voltage H.

As mentioned above, the backlight assembly according to the above-described embodiments of the present invention provides the following advantages. In the backlight assembly, the high voltage H is applied to respective adjacent first end portions of the light sources, and the low voltage L is applied to respective adjacent second end portions of the light sources. Thereby, it is possible to decrease the length of the wires corresponding to the high voltage H and the low voltage L, respectively. Accordingly, the backlight assembly according to the above-described embodiments of the present invention is not impacted by mechanical restrictions due to the length of the wires, thereby providing a thin LCD device.

It will be apparent to those skilled in the art that various modifications and variations can be made in the in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
   at least two bent tube light sources, each of which including a first end portion and a second end portion, respectively, the first end portions of the at least two light sources being adjacent to each other, and the second end portions of the at least two light sources being adjacent to each other; and
   a voltage supplier for applying a high voltage to the adjacent first end portions of the at least two light sources and a low voltage to the adjacent second end portions of the at least two light sources, wherein the voltage supplier has a first inverter for generating the high voltage; a second inverter for generating the low voltage; at least first two wires, each of which connected to the first end of a respective one of the at least two light sources; at least second two wires, each of which connected to the second end of a respective one of the at least two light sources; a first connector connecting the at least first two wires to the first inverter to provide the high voltage; and a second connector connecting the at least second two wires to the second inverter to provide the low voltage.

2. The backlight assembly of claim 1, wherein the voltage supplier has at least one inverter for generating the high voltage and the low voltage.

3. The backlight assembly of claim 2, further comprising a printed circuit board on which the at least one inverter is mounted, wherein the at least one inverter is adjacent to first end of the light sources.

4. The backlight assembly of claim 2, wherein the at least one inverter is provided with a first transformer for outputting the high voltage, and a second transformer for outputting the low voltage.

5. The backlight assembly of claim 4, wherein the printed circuit board includes a first metal pattern connecting an output terminal of the first transformer to the first connector, and a second metal pattern connecting an output terminal of the second transformer to the second connector.

6. The backlight assembly according to claim 1 wherein each of the at least two light sources is bent in L-shape.

7. The backlight assembly of claim 6, wherein long sides of the bent first and second light sources are opposite each other, and short sides of the bent first and second light sources are opposite each other.

8. The backlight assembly of claim 1, wherein the first inverter includes a first transformer for outputting the high voltage, and the second inverter includes a second transformer for outputting the low voltage.

9. The backlight assembly of claim 1, wherein the first inverter is disposed adjacent the first end portions of the light sources, and the second inverter is disposed adjacent the second end portions of the light sources.

10. The backlight assembly of claim 1, further comprising a light-guiding plate disposed inside a periphery defined by the at least two bent tube light sources.

11. The backlight assembly of claim 10, wherein the voltage supplier is disposed on a rear surface of the light-guiding plate.

12. A backlight assembly, comprising:
    a first bent tube light source having a first end portion and a second end portion
    a second bent tube light source having a third end portion and a fourth end portion, the third end portion being adjacent to the second end portion, and the fourth end portion being adjacent to the first end portion;
    a voltage supplier for applying a high voltage to the adjacent first and fourth end portions and a low voltage to the adjacent second and third end portions, wherein the voltage supplier includes a first inverter for generating the high voltage and a second inverter for generating the low voltage.
    a first wire connected to the first end portion;
    a second wire connected to the second end portion;
    a third wire connected to the third end portion;
    a fourth wire connected to the fourth end portion
    a first connector connecting the first and fourth wires to the first inverter to provide the high voltage; and
    a second connector connecting the second and third wires to the second inverter to provide the low voltage.

13. The backlight assembly of claim 12, wherein the first connector is adjacent to the first and fourth end portions, and the second connector is adjacent to the second and third end portions.

14. The backlight assembly of claim 12, wherein the first inverter is adjacent to the first and fourth end portions, and the second inverter is adjacent to the second and third end portions.

* * * * *